Sept. 2, 1930.    A. DINA    1,774,789
INTERMITTENT COUPLE AND ADJUSTMENT
Filed May 19, 1925    2 Sheets-Sheet 1
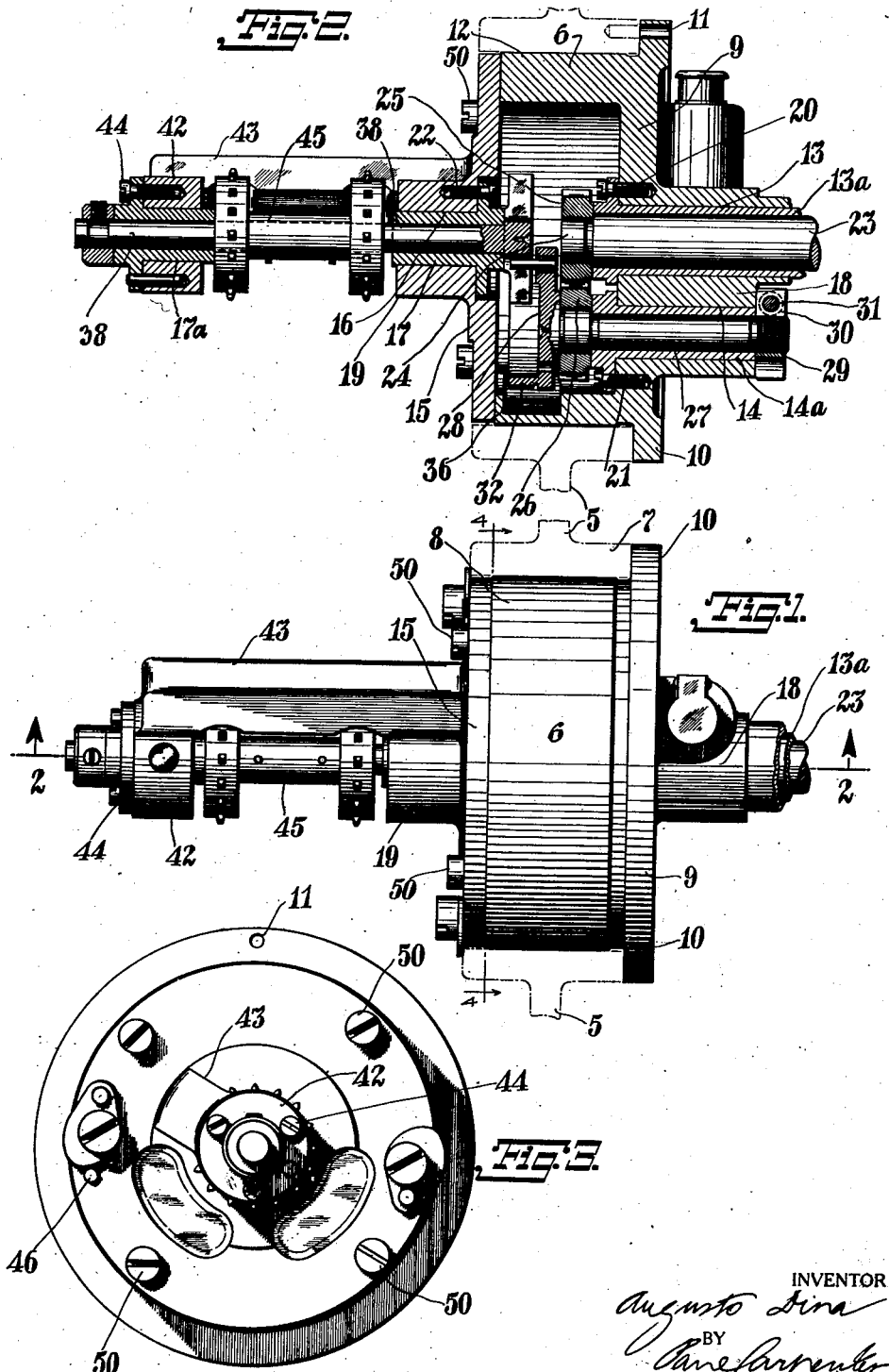
INVENTOR
Augusto Dina
BY
Pane Carpenter
ATTORNEY Sept. 2, 1930. A. DINA 1,774,789
INTERMITTENT COUPLE AND ADJUSTMENT
Filed May 19, 1925 2 Sheets-Sheet 2
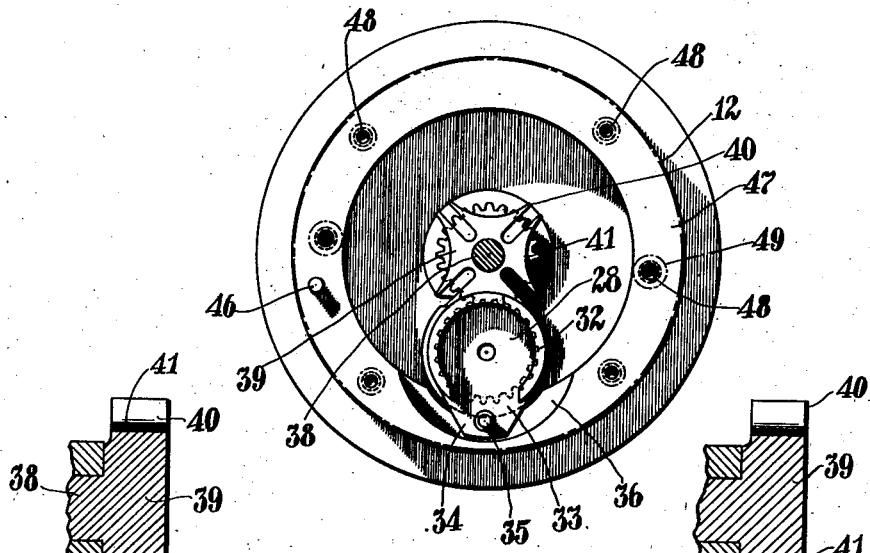
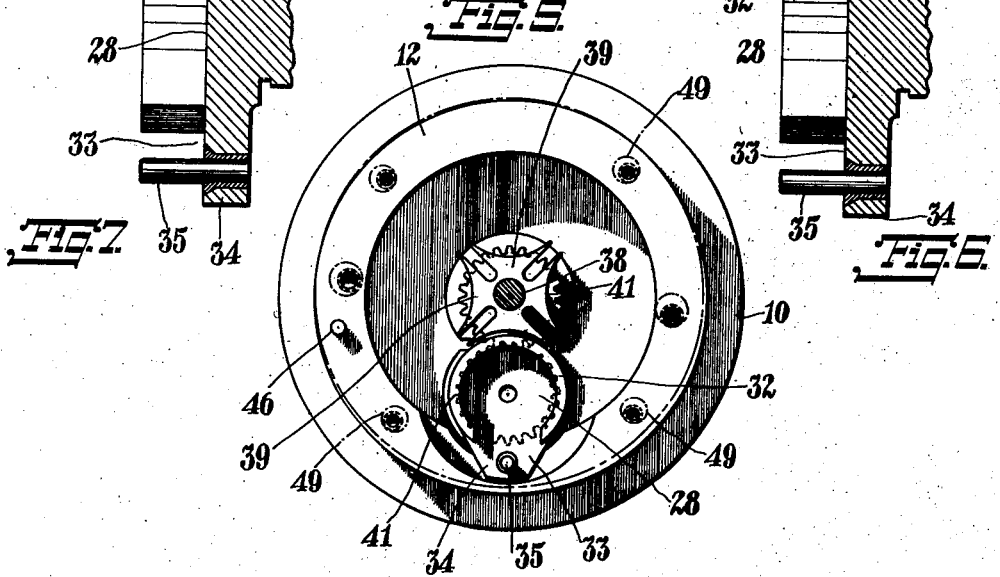
INVENTOR
Augusto Dina
BY
ATTORNEY Patented Sept. 2, 1930

1,774,789

UNITED STATES PATENT OFFICE

AUGUSTO DINA, OF JERSEY CITY, NEW JERSEY, ASSIGNOR TO THE PRECISION MACHINE CO., INC., OF NEW YORK, N. Y., A CORPORATION OF NEW YORK

INTERMITTENT COUPLE AND ADJUSTMENT

Application filed May 19, 1925. Serial No. 31,417.

This invention relates broadly to gearing and more particularly to an improved form of adjusting means peculiarly adapted for employment to take up wear or vibration between two or more elements of an intermittent couple such for instance, as that employed in motion picture projection apparatus.

This invention is particularly described and illustrated as embodied in an intermittent couple for driving the film feeding sprocket of a motion picture projection apparatus for the purpose of taking up wear between the relatively moving driving and driven elements, that is, pin wheel and star wheel, respectively, of a form of Geneva gear, though it will be understood that the invention may be employed in other similar mechanical movements, and therefore finds a wide field of utility for employment in structures other than that shown and described.

It will be understood by those skilled in the art that the film driving sprocket of a motion picture projector is driven by some form of intermittent gearing, more often of the Geneva gear, that is, star and pin wheel type, and that this gearing, due to its high rate of speed, must be absolutely accurate in construction and assembly. It has been found that often in assembly the association of the pin and star wheels of such a movement is too loose, resulting in undue wear and lost motion and resultant noise and inefficiency in operation. Attempts to overcome these defects which in many instances result from inaccurate assembly have brought a type of adjusting mechanism which is costly and difficult to adjust, usually employing two eccentric bushings within which the shafts of the Geneva gearing operate. This arrangement permits of the relative displacement of the shafts for taking up wear, but such adjustment is difficult even for a skilled mechanic and the cost of manufacture is in many instances prohibitive. My invention simplifies this arrangement and not only affords an easy means of adjustment capable of operation by anyone skilled in the operation of the projection machine, but permits this adjustment to be made without material interference with the operation of the machine, and at the same time reduces materially the cost of production of a machine equipped with such an adjusting means.

The principal objects and advantages of this invention reside in the provision of a gearing characterized by the provision therein of improved adjusting means; the provision in a gearing including an intermittently operated member, of improved means for taking up lost motion due to wear or inaccuracy in assembling; the provision of an improved means for adjusting the elements of an intermittent couple gearing; the provision in combination with an intermittent couple including a star wheel and a pin wheel, of means for moving one of said wheels and its axis about a remote pivot for taking up lost motion between the wheels; the provision of improved means for adjusting an intermittent couple by relatively displacing the elements thereof about a single point remote from their axes; the provision of an improved adjusting means for gearing, particularly of the intermittent Geneva gear type, whereby lost motion between the elements may be taken up without disturbance of the elements relatively to their respective axes; the provision of a device of the character referred to which may be employed in conjunction with certain framing mechanisms for motion picture projectors; the provision of an improved adjusting means for gearing including a support, conveniently a casing, for the gearing, having a portion thereof displaceable for adjusting a part of such gearing; and the provision of an improved adjusting means for gearing which tends to reduce the cost of production and serves to compensate for unavoidable inaccuracies occurring in manufacture.

The foregoing and such further objects and advantages as may appear or be pointed out as this description proceeds are attained in the structural embodiment of this device shown in the accompanying drawings, in which:

Figure 1 is a side elevation of a device including the improvements of this invention;

Figure 2 is a longitudinal sectional view of the device shown in Figure 1;

Figure 3 is an end elevational view of the device as seen from the aspect of the left hand side of Figure 1;

Figures 4 and 5 are transverse sectional views taken on the line 4—4 of Figure 1, looking in the direction indicated by the arrows, illustrating the device in different positions of adjustment, certain elements being omitted for clarity;

Figures 6 and 7 are, respectively, enlarged longitudinal sectional views of the rotating elements of the gearing showing these elements before and after adjustment to take up lost motion or space between them.

Referring now more particularly to the drawings, 5 represents a frame, in which the intermittent couple, generally indicated by 6, is removably mounted, said frame forming a relatively fixed part of a conventional motion picture projector the details of which have been omitted here.

The frame 5 is provided with an enlarged annular flange 7 forming an opening for reception of the casing 8 which encloses the intermittent couple 6, said casing comprising a relatively stationary part including the rear wall 9, provided with an annular flange 10 for securement at 11, to the frame 5 by a suitable screw (not shown); annular wall 12; bearing openings 13 and 14, having bushings 13ª and 14ª, and a front wall 15, which latter is removable and secured in position in a manner presently to be described.

The front wall 15 is provided with an axial opening 16, having a bearing bushing 17 mounted therein, the front and rear walls being suitably enlarged, as at 18 and 19, respectively, for supporting the bearing bushings. The bearing bushings, 13ª, 14ª and 17, are fixedly secured in position by the provision of the cap screws 20, 21, and 22, respectively, said bushings each being provided with annular flanges through which said screws are adapted to pass.

The stationary part of the casing supports, in the present instance, the driving member and the front cover member supports the driven member, though this arrangement might be reversed in some mechanism other than that employed in a motion picture projector.

The driving member includes the shaft 23, rotatable in the bushing 13ª; said shaft being connected to suitable driving means forming a part of the projection apparatus not shown here.

The inner end of the shaft 23 projects into the casing 8 axially thereof and is reduced as at 24 to receive a pinion 25, said pinion being fixedly secured to the shaft 23.

The pinion 25 meshes with a complemental pinion 26 mounted upon and fixedly secured to an auxiliary shaft 27, which is rotatable in the bearing bushing 14ª, the said shaft 27 extending through said pinion 26 and carrying a pin wheel 28. The opposite end of the shaft 27 projects beyond the bushing 14ª and the enlarged part 18 and receives a retaining nut 29 which is split at 30 and fixedly secured to the shaft 27 by the provision of a bolt 31.

The pin wheel 28 is provided with an annular flange 32 interrupted to afford a space 33, and said pin wheel is also provided with a radial lug 34 which carries a laterally extending pin 35 disposed in a plane beyond the periphery of the flange 32 but in a radial plane substantially equi-distant between the ends of said flange.

The annular wall 12 of the casing 8 is provided with a pocket 36 in which the projection on the pin wheel is adapted to move as said wheel is rotated and the casing itself is partly filled with a suitable lubricant, the device being placed in the general position shown in Figure 2 so that the pin wheel will operate in the lubricant at all times.

It will be understood that the pin wheel is continuously driven at a substantially constant speed by the shaft 23 and this pin wheel is adapted to impart intermittent motion to the shaft 38 which latter is provided with a so-called star wheel 39 including the four radial slots 40—40 as best shown in Figures 4 and 5. Between the slots the periphery of the star wheel is formed with arcuate surfaces 41—41 of a curvature coincident with the curvature of the flange 32, so that said flange, during its transit past the star wheel, subsequent to a movement of the latter, serves to lock said wheel in one of its positions, and the pin 35 upon arriving at one of the slots 40 imparts a partial rotation to said star wheel and to the shaft 38. The cut away portion of the ring 32 accommodates the projecting parts of the star wheel as it rotates.

The star wheel, as shown in Figure 2, is preferably formed integrally with the shaft 38, and said shaft is supported for rotation in the bushing 17 and also at its outer end in a bushing 17ª carried by the bearing lug 42 formed on the bracket 43, said bushing 17ª being secured in position by the provision of a cap-screw 44. The bracket 43 is conveniently formed integrally with the front wall 15 of the casing 8 and the bushing 17ª is sufficiently spaced from the bushing 17 and enlargement 19 to accommodate the film feeding sprocket 45, which latter is fixedly secured in an approved manner to the shaft 38.

When the device embodying the structure just described is assembled, or after the device has been in operation for a considerable period of time, a discrepancy sometimes will exist between the star wheel and the pin wheel due to the fact that either the parts have become worn or the assembly itself was not entirely accurately carried out.

To overcome the disadvantages resulting from such conditions, I conveniently mount the front wall 15 so that it is relatively movable with respect to the wall 12, this being accomplished here by the provision of a pivot pin 46, seated in a suitable opening formed in the front wall near its periphery so that said front wall may be moved through the arc of a circle (of course very small in the present instance) to bring the curved surfaces 41 of the star wheel into direct contact with the flange 32 when the device is in the position as shown in Figures 4 and 7.

The outer peripheral surface 47 of the wall 12 is provided with a series of threaded openings 48 and the front wall 15 is provided with complemental openings shown in dotted lines at 49 in Figures 4 and 5 for the reception of the cap screws 50 which thus serve to fixedly retain the front wall in its proper position after an adjustment has been made. This adjustment of the wall 15 may be made as the openings 49 are larger than the cap-screws 50.

From Figures 4 to 7 it will be readily seen how such adjustment may be accomplished. In Figures 5 and 6 the flange 32 of the pin wheel is separated from the surface 41 of the star wheel by a space 32ª, and in order to eliminate this space the cap screws 50 may be unscrewed a short distance to permit the front wall to be moved about its pivot. The movement required as a rule will seldom exceed a thousandth of an inch, but by affording this movement of the front wall, any inaccuracy which may have resulted when the front wall was applied to the casing and which would have been maintained if such mounting of the front wall were not adjustable, will be relieved and the lost motion between the star wheel and the pin wheel will be taken up.

The movement of the front wall, while displacing the sprocket 45, will not displace the same to an extent appreciable enough to interfere with or even change the framing of a picture or to interfere with or vary to any extent other adjustments of the motion picture projector. The adjustment afforded by the movement of the front wall also tends to bring the two shafts 23 and 38, into axial alignment and even if the movement does throw these two shafts slightly out of alignment, the proper operation of the machine will not be affected. Another advantage of the arrangement shown is that the two eccentric bushings known to me to have heretofore been employed for attaining this adjustment are eliminated, and furthermore, the intermittent couple is so arranged that the pin wheel remains below the star wheel for the range of framing, thus securing the best lubrication of the parts at all times.

The device furthermore is of such a nature that it may be employed in connection with various framing mechanisms wherein the casing 8 would be rotated in the frame 5 so as to epicyclically displace the pin wheel about the star wheel, such an expedient being employed in my application Serial No. 31,416, to which the device of the present invention may be readily applied.

Having thus described my invention and illustrated its use, what I claim as new and desire to secure by Letters Patent is:

1. In a device of the character described, in combination, a casing having a substantially concentric bearing in one wall, and a cylindrical wall, a cover engaging said cylindrical wall and mounted thereon for angular displacement transversely of said bearing, a substantially concentric bearing carried by said displaceable cover member, and an intermittent couple having the engaging driving and driven parts thereof mounted in said bearings.

2. In a device of the character described, in combination, a casing having a substantially concentric bearing in one wall, and a cylindrical wall, a cover engaging said cylindrical wall and mounted thereon for angular displacement transversely of said bearing, a substantially concentric bearing carried by said displaceable cover member, and an intermittent couple having the engaging driving and driven parts thereof mounted in said bearings, said cover being adjustable for compensating for wear between said parts of the intermittent couple, and means engaging the cover and casing for maintaining the cover in adjusted position.

3. In a device of the character described, in combination, a casing having a substantially concentric bearing in one wall, and a cylindrical wall, a cover engaging said cylindrical wall and mounted thereon for angular displacement transversely of said bearing, a substantially concentric bearing carried by said displaceable cover member, a driving member in the casing and an axis below that of the bearings on the cover, a driven member operating in said bearing on the cover whereby said driven member may adjust itself solely by gravity to compensate for wear between said driving and driven elements.

4. In a device of the character described, in combination, an element to be rotated intermittently, an element for imparting rotation thereto, a casing for both of said elements, said casing being open on one side, a pivoted closure for said casing having a bearing for one of said elements, said closure being pivoted on the wall of said casing at one side of the plane of said bearing and laterally adjustable on its pivot for bodily displacing said bearing and thereby adjusting said elements by gravity.

In testimony whereof I have hereunto affixed my signature this 30th day of December A. D. 1924.

AUGUSTO DINA.